June 20, 1939. R. R. SEARLES 2,162,977
BEARING
Filed March 31, 1937

INVENTOR
RAYMOND R. SEARLES
BY
ATTORNEYS

Patented June 20, 1939

2,162,977

UNITED STATES PATENT OFFICE 2,162,977

BEARING

Raymond R. Searles, New Britain, Conn., assignor to The Fafnir Bearing Company, New Britain, Conn., a corporation of Connecticut Application March 31, 1937, Serial No. 134,130

1 Claim. (Cl. 308—236)

My invention relates to an anti-friction bearing and more particularly to means for holding such a bearing on a shaft or the like. Heretofore inner bearing rings have been held on shafts by various means, including shoulders and nuts, adapter sleeves interposed between the bore of the ring and the shaft, locking collars engaging the ring, etc. Inner rings have also frequently been held on shafts by means of a press fit. The usual press fit is not ordinarily adapted for bearings which are to be slid along a shaft and located at some position thereon, in the field. In other words, press fits are usually employed where assemblies may be made on the bench. All of the other methods of holding inner rings mentioned above involve at least one other part in addition to the inner ring.

It is an object of my invention to provide an improved holding means for an anti-friction bearing ring, involving no loose parts and which may be applied with equal facility on the bench or in the field.

It is another object to provide an anti-friction bearing ring with means integral therewith and forming a part thereof and acting by reason of the inherent resiliency of the ring for holding the same in place and yet which may be very readily applied.

In general the object is to provide an improved, simple means for securely holding a bearing ring in place.

In the drawing which shows, for illustrative purposes only, a preferred form of the invention—

Figure 1:
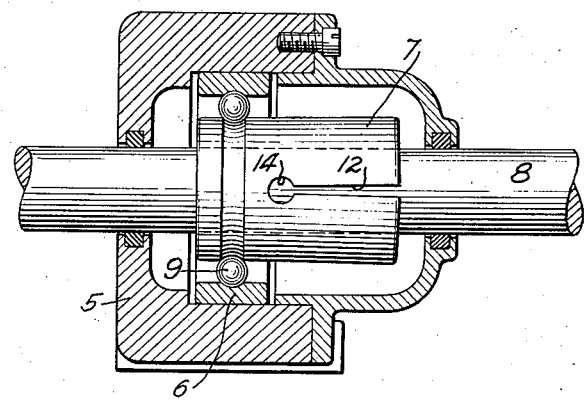
Fig. 1 is a central sectional view through a pillow block and shaft, illustrating my improved bearing in place.

In said drawing 5 indicates any conventional or desirable type of bearing box or pillow block, illustrated here merely for the purpose of showing a complete bearing application. An outer bearing ring 6 is seated in the box 5. A long inner ring 7 is carried by the shaft 8 and anti-friction bearing members, such as balls 9, are interposed between the inner and outer rings and, in the form shown, run in grooved raceways in both rings. My invention relates particularly to means for holding the inner ring 7 on the shaft 8.

Figure 5:
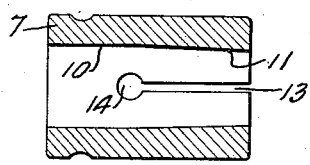
Fig. 5 is a sectional view through an inner ring not under stress and embodying my invention.

Briefly stated the invention in a broad sense may be said to consist in providing the ring with means, dependent upon the inherent resiliency of the bearing ring, for frictionally holding the same to a shaft and such means may take the form shown in detail in Fig. 5. As there illustrated the ring 7 is provided with a bore 10, of a diameter to slide upon but substantially fit a shaft 8. A part of the ring, for example, one end thereof, is provided with a part extending inwardly of the bore 10, so as to securely grip the shaft. As illustrated, the part 11 of the bore is tapered or at least of smaller internal diameter than the bore part 10. The ring adjacent the smaller diameter 11 is expansible and may be made so by slitting the ring. As illustrated in Figs. 1 and 5, the inner ring is provided with a pair of diametrically opposite slots 12—13, extending inwardly from the edge of the ring and terminating in rounded or filleted ends 14, to avoid cracking. It will be seen that the right-hand end of the ring 7 is expansible and by means of any suitable type of tool or wedge the bore 11 may be expanded and the entire ring slid along on the shaft 8 to the desired position and the expanding tool or wedge then removed, so as to permit the inherent resiliency of the ring 7 to tightly contract the bore 11 onto the shaft 8. The extent of the holding force depends upon several factors, including the thickness and degree of resiliency of the inner ring, the point or area of contact between the bore 11 and the shaft, and its distance from the nominal fulcrum about which the bore 11 expand, as well as the extent of normal contraction of the ring when not under stress. These, however, are all design factors, which will be readily understood by those skilled in the art.

Figure 2:
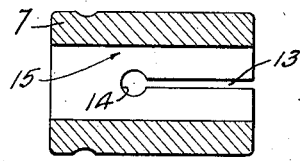
Figs. 2, 3 and 4 are sectional views of a ring and illustrate parts of three steps in one method of manufacture of my improved bearing holding means.
Figure 3:
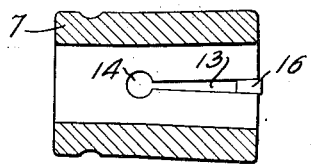
Figure 6:
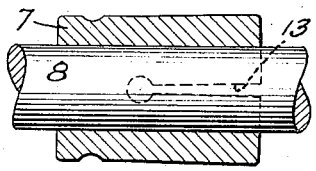
Fig. 6 is a sectional view through the inner ring shown in Fig. 1, that is, illustrating the ring of Fig. 5 applied to a shaft.
Figure 4:
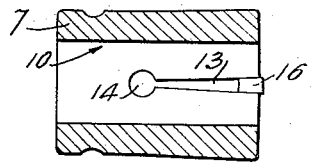

While the ring 7 may be formed in a number of ways and substantially the same results obtained, in Figs. 2, 3 and 4 I have illustrated a method of forming the inner ring which is simple, practical and in conformity with present bearing manufacturing practice. The ring 7, as shown in Fig. 2, is first formed by usual machining methods, so that the entire bore 15 is of uniform diameter and less than the diameter of the shaft which it is to fit. The ring is slotted, as heretofore described. The ring then goes through the usual hardening process and is then ready to be ground. The raceway groove and the outer diameter may be ground by the usual methods. The expansible end of the ring is expanded by any suitable means, such as a wedge 16, forced into a slot. A wedge in the form of a ball may, in practice, be an effective and readily insertible type of wedge. With the ring expanded, as shown in Fig. 3, the ring is subjected to the usual bore grinding process and the bore ground out to the desired uniform diameter while the expansible end remains expanded. The ring, after being bore ground, will appear as in Fig. 4 and the diameter then in the diameter 18, as appears in Fig. 5. If the wedge 16 be now removed the inherent resiliency of the ring will contract the right-hand end, so that the ring will appear substantially as in Fig. 5. In that condition the inner ring may be assembled with the outer ring and balls and the bearing is then complete.

When it is desired to apply the bearing to a shaft the contracted bore is expanded by any suitable tool or wedge, such as the wedge 16 of a screw driver type of wedge, which may be driven into the slot 13 to a sufficient extent to expand the ring and permit the same to be slid along on the shaft to the desired position. When the expanding tool is removed the expanded end of the ring will contract on the shaft and hold the ring with the desired security, determined by the design of the bearing, as heretofore noted.

It will be seen that by my improved means the inner bearing ring is securely held on the shaft concentrically. The security with which the ring is held may be made substantially equal to that of a press fit and yet the bearing may be very readily applied to or removed from the shaft without the aid of a press, and therefore the bearing is readily applicable to shafts where a press is not available nor its use practicable. There are no parts to become loosened or to become lost.

While I have illustrated my invention in an inner bearing ring in which only one end of the ring is expansible, it will be clear that other embodiments may be made and other parts of the ring may be rendered expansible; for example, both ends of the ring may be provided with slots or the like to render the same expansible.

While I prefer to provide a pair of diametrically opposite slots in the ring, since that method provides a proper concentric relationship of the inner ring and the shaft, it is to be observed that in some cases a single slot will suffice and, furthermore, if a plurality of slots be employed they may be arranged as desired, whether or not diametrically opposite.

It will furthermore be clear that the bore need not be formed as herein specifically described and it may be provided with one or more lands or projections to, in effect, bite into the shaft for more securely holding the inner ring against turning or against endwise movement on the shaft.

While the invention has been described in considerable detail and one preferred form illustrated, it is to be understood that various changes and modifications, some of which have been herein indicated, may be made within the scope of the invention as defined in the appended claim.

I claim:

An anti-friction bearing including a long inner and an outer bearing ring with interposed anti-friction bearing members, said inner ring having a bore therein, said bore at the region of said anti-friction bearing members being smooth and of a size to freely slide longitudinally on a shaft, said bore between said anti-friction bearing members and one end being normally of substantially less diameter than the diameter of the shaft, said inner ring being split from said one end inwardly through said bore of substantially less diameter than the shaft to render the same radially expansible, whereby said expansible bore may be expanded and said inner ring freely slid along said shaft and when the expanding force is relieved the inherent resiliency of said inner ring will cause that part of said bore which is normally of less diameter than the shaft to forcibly engage the latter and securely hold said inner ring thereon.

RAYMOND R. SEARLES.